United States Patent Office 3,186,736
Patented June 1, 1965

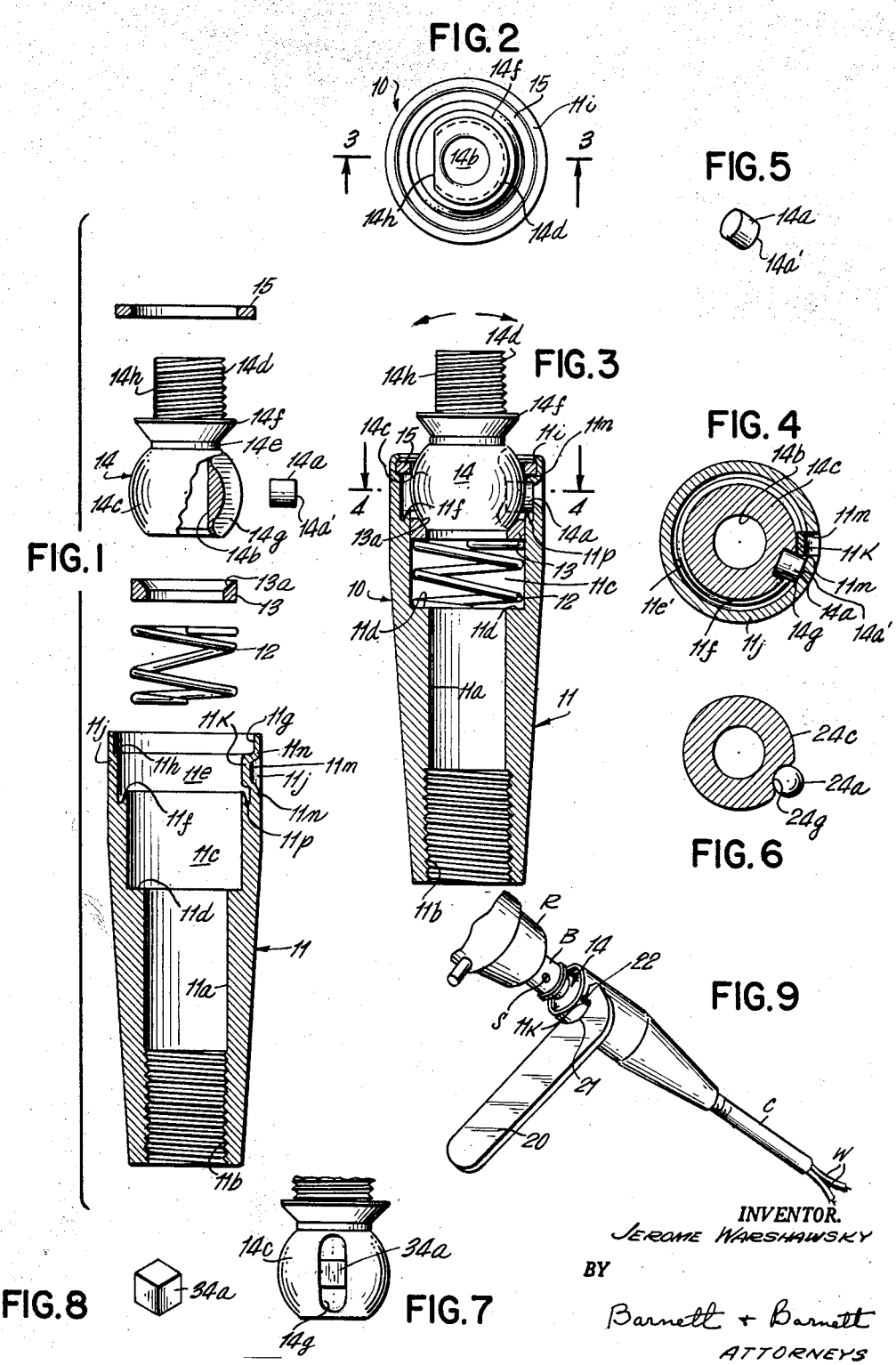

3,186,736
LIMITED UNIVERSAL SWIVEL JOINT FITTINGS FOR ELECTRIC CONDUITS
Jerome Warshawsky, 3284 Bertha Drive, Baldwin, N.Y.
Continuation of application Ser. No. 75,406, Dec. 12, 1960. This application Oct. 2, 1962, Ser. No. 230,308
6 Claims. (Cl. 285—39)

This is a continuation of application Serial No. 75,406, filed December 12, 1960 and now abandoned. This invention relates to electric wiring installations and fittings and more particularly is directed to improve swivel joint fittings for lighting fixtures through which electric wiring extends.

Among the objects of the invention is to provide an improved swivel joint fitting of the character described which shall comprise few and simple parts arranged and constructed in a novel manner to require a minimum of time and labor for assembly in quantity low cost production, which swivel joint shall be readily installed in lighting fixtures particularly adjacent the lamp receptacle to provide limited universal swiveling of the lamp receptacle with respect to a relatively fixed support, which limited universal swiveling shall permit extensive relative movement but prevent excessive rotation eliminating possible damage to the wiring extending therethrough, which shall include an inconspicuous depression in the casing thereof serving both as an element of the swivel limiting means and as an anchor grip permitting use of a spanner wrench in mounting the fitting on a lamp assembly to preserve any previously applied finish, which shall be rugged in construction to withstand rough usage, and which shall be efficient and practical to a high degree.

Other objects of the invention will in part be obvious and in part hereinafter pointed out.

The invention accordingly consists of features of constructions, combination of elements and arrangement of parts which will be exemplified in the constructions hereinafter disclosed, the scope of the application of which will be indicated in the claims following.

In the accompanying drawing in which several illustrative embodiments of the invention are shown:

FIG. 1 is an exploded view of my improved limited universal swivel joint fitting showing the parts prior to assembly, portions being shown broken away and in section.

FIG. 2 is a top plan view of the fitting after completion of the assembly of the parts shown in FIG. 1.

FIG. 3 is a vertical section taken substantially on line 3—3 in FIG. 2.

FIG. 4 is a horizontal section taken on line 4—4 in FIG. 3 showing details of the rotation limiting means.

FIG. 5 is a perspective view of a reciprocating stop in the preferred form of a cylindrical pin as shown in FIGS. 1 to 4, inclusive, removed from the assembly FIG. 6 is a sectional view taken through the spherical head of the swiveling ball member removed from the assembly showing a modified form of reciprocating stop in the form of a bearing ball.

FIG. 7 is a fragmentary elevational view of the swiveling ball member removed from the assembly showing another modified form of reciprocating stop in the form of a cubic body.

FIG. 8 is a perspective view of the cubic body shown in FIG. 7, and

FIG. 9 is a fragmentary perspective view of a lamp assembly utilizing the universal swivel joint fitting shown in FIG. 3 and showing a spanner wrench in operative position engaging the depression stop.

Referring in detail to the drawing, 10 denotes a limited universal swivel joint fitting utilizing a ball and socket arrangement, constructed to embody the invention and seen in FIG. 1 to comprise a socket or base member 11, a compression spring 12, a seating ring 13, a grooved swiveling ball member 14 and a reciprocating stop shown in a preferred form as cylindrical pin 14a and a retaining ring 15.

Socket member 11 may be made of metal stock preferably brass, machined or otherwise formed into a tubular structure having a continuous axial bore 11a, the lower or free end of which may have internal threads 11b for screw mounting onto an end of a lighting fixture or lamp conduit C in the well understood manner. The opposite swiveling ball carrying end of socket member 11 is enlarged to form three counter-bores of increasing diameter, namely, an innermost diametrically smallest counter-bore 11c forming a shoulder 11d with axial bore 11a, an intermediate counter-bore 11e forming a shoulder 11f with counter-bore 11c, and an outermost, diametrically largest counter-bore 11g forming a shoulder 11h with intermediate counter-bore 11e.

Swiveling ball member 14, also made of metal stock similar to socket member 11, may be machined or otherwise formed into an elongated structure having an axial bore 14b and terminating at one end in a spherical shaped head 14c and at an opposite end in an externally threaded portion 14d separated by a neck 14e and shoulder 14f adjacent the threaded portion 14d. A groove or track 41g is formed in the surface of head 14c for receiving cylindrical pin 14a for reciprocation therein as hereinafter more fully described. Although it will be clear that groove 14g can serve its intended purpose within the scope of the invention by being positioned to extend in any of a number of planes provided that opposite ends of groove 14g terminate adjacent the opposite poles of head 14c, it is preferable and most efficient in operation to locate groove 14g along a great circle located in a plane of the axis of bore 14b.

As is clear from FIG. 3, spring 12 and seating ring 13 both seat in innermost counter-bore 11c, spring 12 acting between shoulder 11d, and seating ring 13. Spherical shaped head 14c, in turn seats on a beveled surface 13a of seating ring 13 and is secured by retaining ring 15 and inturned rim edge 11i of socket member 11 for swiveling movement and rotation with respect to socket member 11. Retaining ring 15 has an outer diameter corresponding to that of counterbore 11g for seating on shoulder 11h and an inner diameter engaging spherical shaped head 14c, spring 12 when in assembly being loaded to press seating ring 13 against head 14c.

One of the features of the invention is the provision of a simplified construction and combination of elements including means for limiting the relative rotation between swiveling ball member 14 and socket member 11 which facilitates production and assembly of fitting 10 in fewer machining and manual operations to materially reduce labor costs and increase the production rate as compared with presently known devices.

To these ends, wall section 11j of bore 11e extending between shoulders 11f and 11h has an inward depression 11k formed by any suitable means, such as stamping. As is clear from FIGS. 3 and 4, the portion of bore 11e defined by head 14c, shoulder 11f, wall section 11j and retaining ring 15 form an internal annular groove or track 11e sized to receive for sliding movement therein an end portion of pin 14a extending beyond groove or track 14g, said internal track being interrupted by depression 11k which forms a stop for limiting movement of pin 14a therein to slightly less than one revolution. Satisfactory results have been obtained in stamping depression 11k in such a manner as to shear the metal along the longitudinal sides of depression 11k as at 11m shown in FIG. 4 and to draw the metal along the transverse sides of depression 11k as at 11n shown in FIG. 1. In order to provide wall section 11j with a greater effective length for drawing the metal at the transverse side 11n adjacent shoulder 11f in forming depression 11k, shoulder 11f may be outwardly beveled to form a grove 11p.

It will be clear from the drawing and above description that the construction and arrangement of the parts of fitting 10 contemplates simplified assembly into a unitary operating structure by a single stroke of a suitable press. Thus, after spring 12, seating ring 13, ball member 14 and pin 14a are positioned, respectively, in base member 11 and retaining ring 15 brought over shoulder 14f to rest on head 14c, final assembly is accomplished by urging ball member 14 downwardly into base member 11 compressing spring 12 until retaining ring 15 properly seats on shoulder 11h and then inturning rim edge 11i to provide a permanent closure and retaining means for the assembly.

The practical operation and utility of fitting 10 will now be apparent. After assembly as hereinbefore described, and, if desired, after being polished, plated, lacquered or otherwise finished, fitting 10 is ready for incorporation in a lamp construction. As shown in FIG. 9, fitting 10 may be interposed as a universal joint between a relatively fixed electric wire conduit C and a lamp receptacle R by first threading the conventional internally threaded base B onto threaded portion 14d of ball member 14. A flattened side 14h may be provided on threaded portion 14d for engagement by set screw S in base B to interlock the parts in the conventional manner. Either before or after electric wiring W has been extended through conduit C, axial bore 11a, spring 12, seating ring 13, axial bore 14b and into receptacle R for connection to the terminals of a lamp socket (not shown), base member 11 may be tightened onto conduit C. A spanner wrench 20, having an arcuate cut out 21 shaped for receiving the circular contour of the upper portion of base member 11 and a hook-like projection 22 for engaging in depression 11k and particularly for engaging with one of the planar longitudinal sides thereof in wall section 11j formed by the shearing at 11m, may be utilized to grip base member 11 for tightening without defacing the polished, plated, lacquered or otherwise finished surface.

In operation, fitting 10 imparts limited universal movement to receptacle R with respect to conduit C. The construction of fitting 10 above described and shown in the drawing contemplates ball member 14 pivoting or bending in any direction with respect to base member 11 through an angle of approximately 30° from the longitudinal axis of base member 11 and simultaneously rotating on said axis through an arc of slightly less than 360°. Thus, in all positions of ball member 14 pin 14a extends through the intersection of grooves 14g and track 11e'. Movement of pin 14a in groove 14g permits the pivoting or bending action of ball member 14 while movement of pin in track 11e' permits the limited rotating action thereof through an arc of slightly less than 360°, the extent of track 11e' from one side of depression stop 11k to the other.

In assembling fitting 10, spring 12 is compressed, that is, loaded, to a predetermined degree to exert sufficient pressure against seating ring 13 so as to frictionally grip spherical head 14c between seating ring 13 and retaining ring 15 for supporting the weight of receptacle R and associated parts in all adjusted positions of ball member 14. To insure proper operation, spring 12 should possess sufficient resiliency permitting smooth relative movement of ball member 14 in base member 11 when pressure is applied to reposition receptacle R.

Other forms of reciprocating stops may be used in place of cylindrical pin 14a. Thus, FIG. 6 shows one modified form as bearing ball 24a which has a correspondingly shaped groove 24g formed in spherical head 24c and FIGS. 7 and 8 show another form as prismatic or cubic pin 34a which may be sized to fit in groove 14g of spherical head 14c in the same manner as cylindrical pin 14a.

It will be clear from FIGS. 3 and 4 that cylindrical pin 14a is positioned to extend across the intersection of groove 14g and track 11e' with the axis of the cylinder in radial alignment with respect to spherical head 14c so that the bases or flat surfaces 14a' face the bottoms of groove 14g and track 11e'. As is clear from FIG. 4, this disposition of pin 14a affords a straight line contact with depression stop 11k.

In practice cylindrical pin 14a and prismatic pin 34a have been found to render more efficient results than bearing ball 24a. Pins 14a and 34a coacting with depression stop 11k are capable of withstanding greater torque applied between ball member 14 and base member 11 than does bearing ball 24a. Unless extremely close tolerances are maintained, bearing ball 24a has a tendency when subjected to relatively high pressure against depression stop 11k to act as a cam and force depression stop 11k outwardly into wall section 11j thereby eliminating its obstructive function.

It is thus seen that there is provided improved limited universal swivel joint fittings for electric conduits whereby the several objects of this invention are achieved and which are well adapted to meet the conditions of practical use.

As various possible embodiments might be made of the above invention, and as various changes might be made in the embodimtnts above set forth, it is to be understood that all matters herein set forth or shown in the accompanying drawing are to be interpreted as illustrative and not in a limting sense.

Having thus described my invention, I claim as new and desire to secure by Letters Patent:

1. A swivel joint fitting comprising a tubular socket member having an axial bore enlarged at one end, a swiveling ball member having an axial bore and a spherical shaped head terminating one end thereof, said head being movably mounted in said socket member bore enlarged end for adjustable angular and rotary movement of the ball member with respect to the socket member with said axial bores in continuity for extension of electric wiring therethrough, an internal track formed in said socket member having a wall forming an exterior wall portion of said socket member, said spherical shaped head being formed with a generally axially extending groove intersecting said track, a pin extending across said intersection into said groove and track and having an axis in radial alignment with respect to said spherical shaped head, and a depression formed in said exterior wall portion extending as an obstruction into said track for engaging said pin to limit said rotary movement to less than one complete revolution, said radial axis of the pin having a length substantially equal to the radial distance between the bottoms of said groove and track, said pin having a base surface facing said track bottom and a side surface extending substantially parallel to said axis and forming a relatively sharp edge with said base surface for positive contact with said depression on said engagement of the pin therewith.

2. The swivel joint fitting defined in claim 1 in which said pin is cylindrical in shape with said axis forming the axis of the cyilnder, said base surface forming the base of the cyilnder and said side surface forming the cylindrical surface of the cylinder.

3. The swivel joint fitting defined in claim 1 in which said pin is prismatic in shape with said axis forming the axis of the prism, said base surface forming the base of the prism and said side surface forming the sides of the prism.

4. The swivel joint fitting defined in claim 1 in which said depression has longitudinal sides sheared from said wall portion and disposed transversely of the track as planar surfaces for said engagement with said pin.

5. The swivel joint fitting defined in claim 1 in which said depression has longitudinal sides sheared from said wall portion and disposed transversely of the track as planar surfaces for said engagement with said pin, said socket member being formed of metal with said depression stamped from the outer surface of said exterior wall portion, said internal track having a wall adjacent said exterior wall portion formed with an outward bevel to provide the exterior wall portion with an increased effective length for drawing metal in forming said depression.

6. A swivel joint fitting of the character described comprising a tubular socket member having an axial bore enlarged at one end to form a first innermost counterbore, a second intermediate counter-bore and a third outermost counter-bore having an inturned rim edge, the diameters of said counter-bores successively increasing and defining a first shoulder between said axial bore and said first counter-bore, a second shoulder between said first and second counter-bores and a third shoulder between said second and third counter-bores, a seating ring axially aligned in said first counter-bore, a retaining ring secured in said third counter-bore between said third shoulder and inturned rim edge, a swiveling ball member having an axial bore and a spherical shaped head terminating one end thereof, said head being mounted in said socket member between said seating and retaining ring, a free end of said ball member opposite said head extending through said retaining ring, said ball member being adjustable for angular and rotary movement with respect to the socket member with said axial bores in continuity for extension of electric wiring therethrough, a helical compression spring in said first counter-bore acting between said first shoulder and the seating ring exerting resilient pressure against the head for retention in any adjusted position, said second counter-bore having a wall, the latter, said second shoulder and said retaining ring defining an internal track in said socket member extending in a plane substantially at right angles to said socket member axial bore, said spherical shaped head being formed with a groove intersecting said track, a pin extending across said intersection into said groove and track and having an axis in radial alignment with respect to said spherical shaped head, and a depression formed in said second counter-bore wall extending as an obstruction into said track for engaging said pin to limit said rotary movement to less than one complete revolution, said radial axis of the pin having a length substantially equal to the radial distance between the bottoms of said groove and track, said pin having a base surface facing said track bottom and a side surface extending substantially parallel to said axis and forming a relatively sharp edge with said base surface for positive contact with said depression on said engagement of the pin therewith.

References Cited by the Examiner

UNITED STATES PATENTS

| | | | |
|---|---|---|---|
| 577,413 | 2/97 | Bray | 285—39 |
| 1,927,703 | 9/33 | Glowacki | 285—166 |
| 2,448,494 | 8/48 | Moser | 287—87 |
| 2,524,894 | 10/50 | Dobrin | 287—12 |
| 2,623,763 | 12/52 | Fauser | 287—87 |
| 2,749,074 | 6/56 | Bodian | 287—21 |
| 2,910,310 | 10/59 | Mulac | 285—91 |
| 3,012,798 | 12/61 | Berger | 287—91 |
| 3,034,809 | 5/62 | Greenberg | 285—267 |
| 3,037,799 | 6/62 | Mulac | 287—87 |

CARL W. TOMLIN, *Primary Examiner.*